United States Patent
Virtanen et al.

(10) Patent No.: US 11,096,235 B2
(45) Date of Patent: Aug. 17, 2021

(54) METHOD FOR DETECTING LINK STATUS

(71) Applicant: Teleste Oyj, Littoinen (FI)

(72) Inventors: Kari Virtanen, Naantali (FI); Jyrki Alamaunu, Turku (FI); Jani Väre, Kaarina (FI); Sami Saarinen, Littoinen (FI)

(73) Assignee: TELESTE OYJ, Littoinen (FI)

( * ) Notice: Subject to any disclaimer, the term of this patent is extended or adjusted under 35 U.S.C. 154(b) by 90 days.

(21) Appl. No.: 16/332,496

(22) PCT Filed: Sep. 29, 2016

(86) PCT No.: PCT/FI2016/050679
§ 371 (c)(1),
(2) Date: Mar. 12, 2019

(87) PCT Pub. No.: WO2018/060541
PCT Pub. Date: Apr. 5, 2018

(65) Prior Publication Data
US 2019/0239276 A1    Aug. 1, 2019

(51) Int. Cl.
*H04W 76/25* (2018.01)
*H04L 12/707* (2013.01)
(Continued)

(52) U.S. Cl.
CPC .............. *H04W 76/25* (2018.02); *H04L 12/40* (2013.01); *H04L 45/22* (2013.01); *H04W 24/04* (2013.01);
(Continued)

(58) Field of Classification Search
CPC ..................................................... H04W 76/25
See application file for complete search history.

(56) References Cited

U.S. PATENT DOCUMENTS

| 7,002,932 B1 | 2/2006 | Young |
| 8,514,825 B1 * | 8/2013 | Addepalli ............... H04L 69/18 370/338 |

(Continued)

FOREIGN PATENT DOCUMENTS

| WO | 2009033168 A1 | 3/2009 |
| WO | 2013075734 A1 | 5/2013 |

OTHER PUBLICATIONS

Search report of international application PCT/FI2016/050679 issued by Finnish Patent Office dated Jan. 30, 2017, 4 pages.

*Primary Examiner* — Jae Y Lee
*Assistant Examiner* — Andrew C Lee
(74) *Attorney, Agent, or Firm* — Mueting Raasch Group

(57) ABSTRACT

A method and relates apparatuses for detecting a link status on an Ethernet connection where at least part of a transmission path is implemented via a wireless connection, the first wireless link device performing: establishing a wireless connection to a second wireless link device; establishing a wired connection to a first Ethernet-compliant network device; sending a remote link status message indicating the status of the wired connection between the first wireless link device and the Ethernet-compliant network device repeatedly to the second wireless link device; monitoring a remote link status message received from the second wireless link device, said remote link status message indicating the status of the wired connection between the second wireless link device and a second Ethernet-compliant network device.

20 Claims, 4 Drawing Sheets

(51) Int. Cl.
*H04W 24/04* (2009.01)
*H04W 76/32* (2018.01)
*H04W 76/18* (2018.01)
*H04L 12/40* (2006.01)
*H04W 24/08* (2009.01)
H04W 84/12 (2009.01)
H04L 12/66 (2006.01)
H04W 84/00 (2009.01)

(52) U.S. Cl.
CPC ........... *H04W 24/08* (2013.01); *H04W 76/18* (2018.02); *H04W 76/32* (2018.02); H04L 12/66 (2013.01); H04L 2012/40273 (2013.01); H04W 84/005 (2013.01); H04W 84/12 (2013.01)

(56) References Cited

U.S. PATENT DOCUMENTS

| | | | |
|---|---|---|---|
| 8,705,527 B1* | 4/2014 | Addepalli | H04L 61/2592 370/389 |
| 9,762,470 B2* | 9/2017 | Alam | H04L 43/10 |
| 10,341,917 B2* | 7/2019 | Vare | H04W 36/24 |
| 2011/0182289 A1 | 7/2011 | Raman | |
| 2016/0359741 A1* | 12/2016 | Cooper | H04L 45/74 |
| 2017/0195897 A1* | 7/2017 | Lopes | H04L 69/40 |
| 2018/0056995 A1* | 3/2018 | Deng | B60W 10/184 |
| 2018/0199237 A1* | 7/2018 | Vare | H04W 28/08 |

* cited by examiner

METHOD FOR DETECTING LINK STATUS

PRIORITY

This application is a U.S national application of the international application number PCT/FI2016/050679 filed on Sep. 29, 2016, the contents of which are incorporated herein by reference.

TECHNICAL FIELD

The invention relates to wireless Ethernet technologies, specifically to detecting a link status in such technologies.

BACKGROUND

It is generally known that an Ethernet connection may be implemented such that a part of the connection is implemented as a wireless link. For example, Ethernet cabling between devices, such as bridges, switches and hubs, can be replaced with at least two wireless link devices, i.e. media converters, which convert the Ethernet data to a transmission format suitable for wireless connection.

In a normal operation, the Ethernet ports of the wireless link devices are in active state. However, if a wireless link is disconnected for some reason, the Ethernet port of the respective wireless link device remains in the active state. Thereupon, a switch connected by a cable to the Ethernet port of the wireless link device sees an active Ethernet connection and continues to transmit data to the Ethernet port of the wireless link device, even if no point-to-point connection is actually available.

There are known solutions for detecting link failure is such situations. For example, Address Resolution Protocol (ARP) based solutions may be used to detect link failure. However, ARP-based solutions are rather slow. A faster link failure detection may be obtained using Link Aggregation Control Protocol (LACP), which may detect a failure of at least one wireless link, depending on the configuration, in 3-90 seconds.

However, there may be situations where even faster link status detection would be needed. For example, in wireless data offload systems used in public transportation vehicles, there may be a vast amount of data buffered in the vehicle, which data should be offloaded when the vehicle arrives at the stations or in a depot where the vehicle is configured to stop. The stopping times at the stations or bus/tram stops may be very short, whereupon a possible link failure should be detected as fast as possible in order to offload the buffered video and/or user data during the stoppage. Therefore, as fast link status detection as possible is required.

SUMMARY

Now, an improved arrangement has been developed to reduce the above-mentioned problems. As different aspects of the invention, we present a method, a system, a computer program product and a wireless link device, which are characterized in what will be presented in the independent claims.

The dependent claims disclose advantageous embodiments of the invention.

The first aspect of the invention comprises a method for detecting a link status on an Ethernet connection where at least part of a transmission path is implemented via a wireless connection, the method comprising a first wireless link device performing: establishing a wireless connection to a second wireless link device; establishing a wired connection to a first Ethernet-compliant network device; sending a remote link status message indicating the status of the wired connection between the first wireless link device and the Ethernet-compliant network device repeatedly to the second wireless link device; monitoring a remote link status message received from the second wireless link device, said remote link status message indicating the status of the wired connection between the second wireless link device and a second Ethernet-compliant network device; and in response to no remote link status message is received within a predetermined period or the received remote link status message indicating a failed connection between the second wireless link device and the second Ethernet-compliant network device, shutting down the wired connection to the first Ethernet-compliant network device.

According to an embodiment, in response to shutting down the wired connection to the first Ethernet-compliant network device due to no remote link status message received within a predetermined period, continuing the method by monitoring whether there is a wireless connection established to the second wireless link device.

According to an embodiment, in response to shutting down the wired connection to the first Ethernet-compliant network device due to the received remote link status message indicating a failed connection between the second wireless link device and the second Ethernet-compliant network device, continuing the method by monitoring a next remote link status message received from the second wireless link device.

According to an embodiment, the link failure is detected from an Ethernet port of the first Ethernet-compliant network device in response to shutting down the wired connection to the first Ethernet-compliant network device.

According to an embodiment, the remote link status message sent repeatedly to the second wireless link device indicates the wired connection between the first wireless link device and the Ethernet-compliant network device to be either established or failed.

According to an embodiment, the wireless connection between the first and the second wireless link device is carried out according to IEEE 802.11ad or IEEE 802.11aj standard series.

According to an embodiment, the first wireless link device is arranged in a public transportation vehicle, such as a train, a tram, a metro train or a bus, arranged to travel a predetermined route.

According to an embodiment, data transmission between the first and the second wireless link device is used in wireless offload for transmitting data from the public transportation vehicle to at least one access point for further forwarding the data to a data communication network.

According to an embodiment, data transmission between the first and the second wireless link device is a part of transmission path of an internal network of the public transportation vehicle between two cars of said public transportation vehicle.

Further aspects include at least apparatuses and computer program products/code stored on a non-transitory memory medium arranged to carry out the above methods.

BRIEF DESCRIPTION OF THE DRAWINGS

The invention will now be described in more detail in connection with preferred embodiments with reference to the appended drawings, in which.

DETAILED DESCRIPTION

Figure 1:
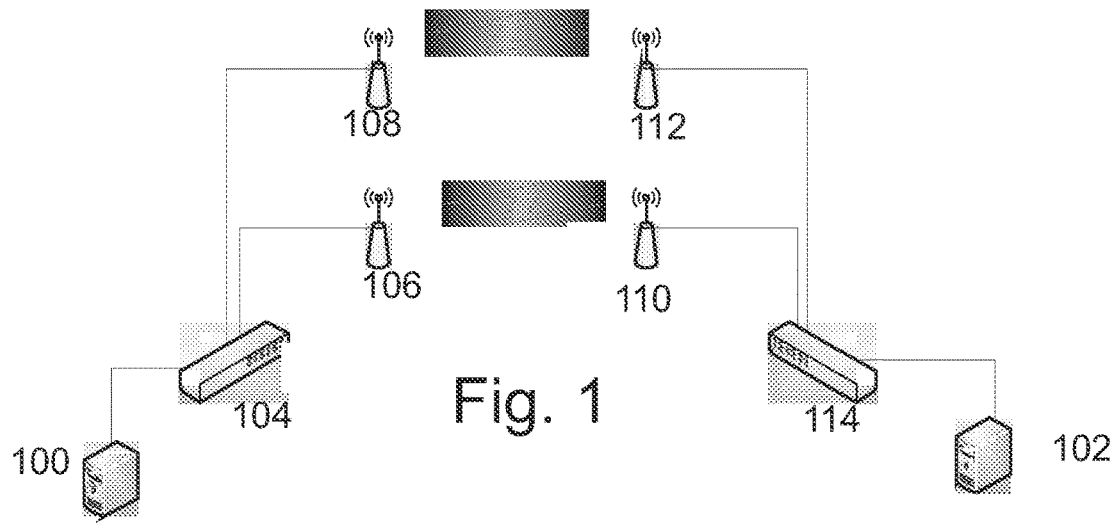
FIG. 1 shows a simplified example of a data transmission arrangement having at least part of an Ethernet transmission path implemented via a wireless connection.

FIG. 1 illustrates an example of a typical data transmission arrangement, where the problems underlying the present embodiments may be encountered. In the arrangement, data is transmitted from a first data processing device 100, such as a first server, to a second data processing device 102, such as a second server, via an Ethernet connection.

As a starting point, the data is transmitted from the first data processing device 100 to a first switch 104. A part of the Ethernet transmission path is implemented as wireless connection. For maximizing the throughput of the wireless connection, a plurality of wireless links may be used, provided that the first switch supports link aggregation for a plurality of wireless links. FIG. 1 shows two wireless links as an example, but the number of wireless links may be 1, 2, 3, 4, or more depending on the link aggregation capabilities of the switch. The switch handles the load balancing for both wireless links so as to obtain maximum or at least sufficient throughput of the data.

For implementing the wireless links, there are a first wireless link device 106 and a second wireless link device 108. Ethernet ports of both wireless link devices 106, 108 are connected to Ethernet ports of the first switch 104 via a wired connection. For providing the wireless link for the Ethernet connection, the wireless link devices comprise a media converter for converting the Ethernet data to a transmission format suitable for wireless connection. For example, wireless access technology defined in IEEE standard series 802.11, including multiple versions of the IEEE 802.11, such as 802.11b, 802.11g, 802.11a, 802.11n, 802.11ac, may be used herein. IEEE 802.11 technology is used as a shared medium that operates in unlicensed radio frequency ranges of 2.4 GHz and/or 5 GHz.

The counterparts of the wireless links comprise a third wireless link device 110 and a fourth wireless link device 112, both implementing a media converter arranged to convert the wireless transmission format back to Ethernet data. Ethernet ports of both wireless link devices 110, 112 are connected to Ethernet ports of a second switch 114 via a wired connection. The second switch supports link aggregation for at least two wireless links. The aggregated data is then transmitted to the second data processing device 102.

In a normal operation, the Ethernet ports of the wireless link devices are in active state. However, if a wireless link is disconnected for some reason, the Ethernet port of the respective wireless link device remains in the active state. In the arrangement of FIG. 1, this causes the problem that, in static load balancing case, both switches 104, 114 see an active Ethernet connection and the switch 104 continues to transmit data to the Ethernet port of the wireless link device underlying the disconnected link, even if no point-to-point connection is actually available. In the case of link aggregation of a plurality of wireless links, this will cause problems in load balancing and will typically require retransmission of at least some data from the switch.

The above example is related to link aggregation of a plurality of wireless links. However, it is naturally possible to implement the wireless connection of the Ethernet transmission path using only one wireless link (no link aggregation). In such case, the disconnection of the wireless link is even more severe problem, since the data connection is completely lost.

There are known solutions for detecting link failure is such situations. For example, Address Resolution Protocol (ARP) based solutions may be used to detect link failure. However, ARP-based solutions operate at IP protocol level and are slow. A faster link failure detection may be obtained using Link Aggregation Control Protocol (LACP). In case of link aggregation, the LACP continues to transmit data using available wireless link(s), but still detecting a failure of at least one wireless link happens, depending on the configuration, in 3-90 seconds. The LACP has the further drawback that it limits the possible load balancing options to only those supported by IEEE 802.1ax and 802.1aq (previously 802.3ad).

However, there may be situations where even faster detection of the link status would be needed. For example, in wireless data offload systems used in public transportation vehicles, there may be a vast amount of data buffered in the vehicle, which data should be offloaded when the vehicle arrives at the stations or in a depot where the vehicle is configured to stop. The stopping times at the stations or bus/tram stops may be less than 10-15 seconds, whereupon establishing a link and a possible link failure should be detected as fast as possible in order to offload the buffered video and/or user data during the stoppage. Therefore, wireless offload requires maximum throughput and as fast link establishing and failure detection as possible.

In order to alleviate these problems, a new method for detecting a link status is presented herein. The method is based on the idea that the wireless link devices on the both side of the connection continuously send link status messages to the other side, and upon detecting an error situation, the wireless link devices shut down their own Ethernet ports towards the Ethernet-compliant network device in order to indicate the disconnection of the Ethernet connection to the Ethernet-compliant network device.

Figure 2:
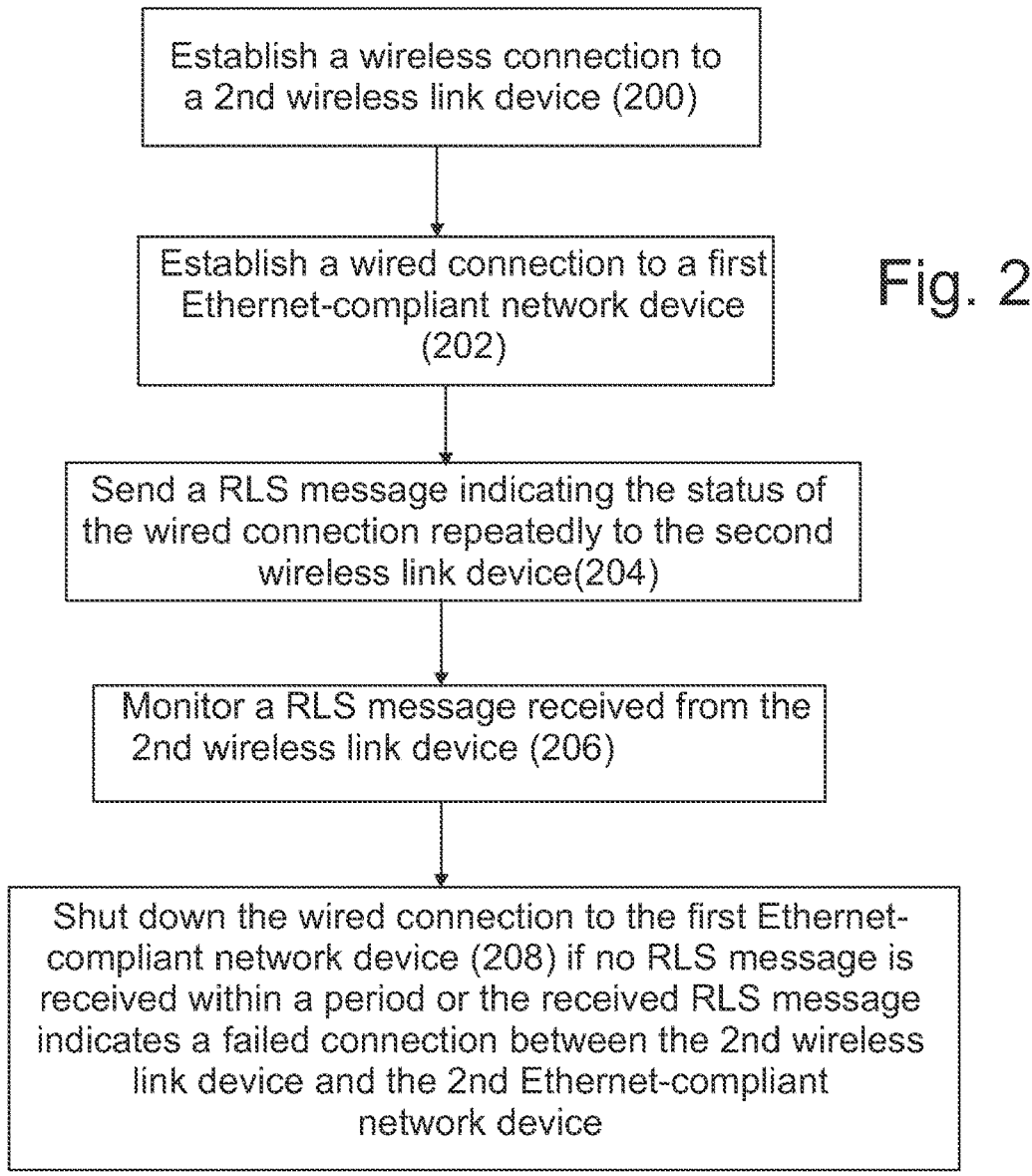
FIG. 2 shows a flow chart of a link detection algorithm according to an embodiment.

A method according to a first aspect and various embodiments related thereto are now described by referring to the flow chart of FIG. 2. The method of FIG. 2 may be applied on an Ethernet connection where at least part of a transmission path is implemented via a wireless connection.

The method according to the first aspect comprises a first wireless link device performing: establishing (200) a wireless connection to a second wireless link device; establishing (202) a wired connection to a first Ethernet-compliant network device; sending (204) a remote link status message indicating the status of the wired connection between the first wireless link device and the Ethernet-compliant network device repeatedly to the second wireless link device; monitoring (206) a remote link status message received from the second wireless link device, said remote link status message indicating the status of the wired connection between the second wireless link device and a second Ethernet-compliant network device; and in response to no remote link status message is received within a predetermined period or the received remote link status message indicating a failed connection between the second wireless link device and the second Ethernet-compliant network device, shutting (208) down the wired connection to the first Ethernet-compliant network device.

Thus, due to sending the remote link status message repeatedly to the second wireless link device, the establishing of the wireless link may be detected immediately in both wireless link devices. On the other hand, if the remote link status message is delayed or indicates an error situation, this is interpreted as a link failure and the wired connections from the wireless link devices to the Ethernet-compliant network devices are shut down.

According to an embodiment, in response to shutting down the wired connection to the first Ethernet-compliant network device due to no remote link status message received within a predetermined period, continuing the method by monitoring whether there is a wireless connection established to the second wireless link device. Accordingly, a non-received remote link status message may refer either to a disconnected wireless connection or to connection problems between the second wireless link device and the second Ethernet-compliant network device. Therefore, it is preferably first checked whether the wireless connection to the second wireless link device is still established.

According to an embodiment, in response to shutting down the wired connection to the first Ethernet-compliant network device due to the received remote link status message indicating a failed connection between the second wireless link device and the second Ethernet-compliant network device, continuing the method by monitoring a next remote link status message received from the second wireless link device. Accordingly, a received remote link status message indicates that the wireless connection to the second wireless link device is still established. Therefore, the first wireless link device remains in a loop for monitoring when a remote link status message indicating a re-established connection between the second wireless link device and the second Ethernet-compliant network device is received. Receiving such remote link status message provides immediate information about a re-established connection.

According to an embodiment, the link failure is detected from an Ethernet port of the first Ethernet-compliant network device in response to shutting down the wired connection to the first Ethernet-compliant network device. Thus, when the first wireless link device pulls down its own Ethernet port, the first Ethernet-compliant network device, such as a switch, notices this immediately in its own Ethernet port and seizes any further communication to the first wireless link device. It is noted that the second wireless link device and the second Ethernet-compliant network device operate in synchronism with the first wireless link device and the first Ethernet-compliant network device, and therefore the second Ethernet-compliant network device is similarly indicated to stop the communication.

According to an embodiment, the remote link status message sent repeatedly to the second wireless link device indicates the wired connection between the first wireless link device and the first Ethernet-compliant network device to be either established or failed. For enabling a fast detection of a point-to-point link failure, the first wireless link device sends repeatedly, such as with a period of a few milliseconds, the remote link status message indicating either an established ("RLS OK") or a failed ("RLS failed") connection between the first wireless link device and the first Ethernet-compliant network device, to the second wireless link device. Similarly, the second wireless link device sends repeatedly "RLS OK" or RLS failed" message relating to the connection between the second wireless link device and the second Ethernet-compliant network device, to the first wireless link device. Thus, both wireless link devices remain immediately informed about any link failures on the other side of the connection.

According to an embodiment, the wireless connection between the first and the second wireless link device is carried out according to IEEE 802.11ad or IEEE 802.11aj standard series. The wireless access technology defined in IEEE 802.11ad provide 60 GHz wireless transmission band with multi-gigabit throughput up 7 Gbit/s, but with a transmission range limited to about ten meters. In IEEE 802.11aj, the wireless transmission band is implemented at 45 GHz. The maximum throughput of IEEE 802.11ad or IEEE 802.11aj connection exceeds that of a conventional Ethernet cable connection; in a sense, the IEEE 802.11ad or IEEE 802.11aj transmission path may be referred to as "a wireless cable".

Nevertheless, one of the advantages of the present embodiments, for example compared to LACP, is that they are not limited to IEEE 802.11ad/aj connections only. Thus, the embodiments may be utilised in connection the WLAN technology according to any of IEEE 802.11 standard series, for example. It is, however, noted that the implementation of the embodiments disclosed herein are not limited to the WLAN technology according to any of IEEE 802.11 standard series only, but the embodiments may be applied to any similar wireless communication technology providing sufficient bandwidth. For example, it may be possible to use a proprietary wireless technology utilising the 60 MHz or 45 MHz bandwidth.

Moreover, the present embodiments enable an implementation of link status detection embedded in the wireless device which operates with different Ethernet devices without a need to support prior art link failure detection protocols. Thus, in addition to being faster than any known link status detection method, the embodiments enable a wider selection of technologies for load balancing.

Figure 3:
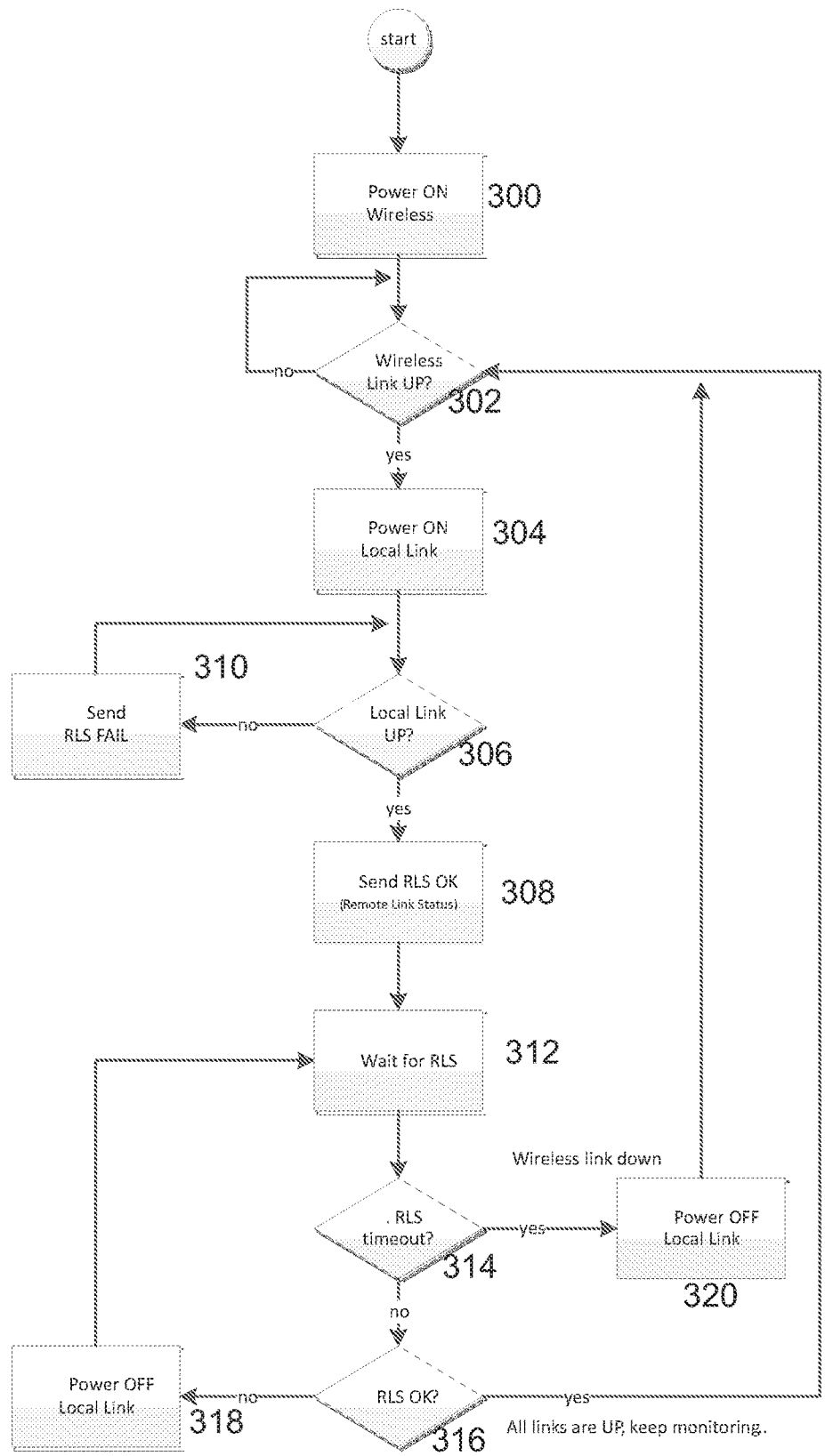
FIG. 3 shows a flow chart of a link detection algorithm according to various embodiments.

FIG. 3 shows a flow chart describing various embodiments related to the link management algorithm according to the invention.

The power of the first wireless link device is switched on (300) and a wireless link between the first wireless link device and a second wireless link device is established (302). The local link towards the local Ethernet hardware, such as an Ethernet switch, may then be switched on (304) in the first wireless link device. The first wireless link device checks (306), if the local Ethernet link via the Ethernet hardware is established. If the local Ethernet link is up, the first wireless link device sends (308) Remote Link Status (RLS) OK information over the wireless link to the second wireless link device. If the local Ethernet link is not established, the first wireless link device sends (310) Remote Link Status (RLS) Failed information over the wireless link to the second wireless link device, and lops back to check (306), when the local Ethernet link via the Ethernet hardware is established.

After ensuring that the local Ethernet link between the first wireless link device and its corresponding Ethernet hardware has been established, the first wireless link device remains waiting (312) for Remote Link Status information from the second wireless link device via the wireless link. There may be set a predetermined timeout period (314) for receiving Remote Link Status information from the second wireless link device. If the Remote Link Status information from the second wireless link device is received within the predetermined timeout period, it is checked (316) whether the Remote Link Status information is "RLS OK" or "RLS Failed". If the Remote Link Status information is "RLS OK", the first wireless link device continues to monitor that the wireless link between the first wireless link device and a second wireless link device remains established (302).

However, if the Remote Link Status information is "RLS Failed", the first wireless link device shuts down (318) the local Ethernet link between the first wireless link device and its corresponding Ethernet hardware. Since the received "RLS Failed" information indicates that the local Ethernet link between the second wireless link device and its corresponding Ethernet hardware has been failed, but the wireless link between the first wireless link device and the second wireless link device remains established, the first wireless link device returns to wait (312) for Remote Link Status information from the second wireless link device.

On the other hand, if the Remote Link Status information from the second wireless link device is not received within the predetermined timeout period (314), it may be an indication that the wireless link between the first wireless link device and the second wireless link device has failed, and therefore the first wireless link device shuts down (320) the local Ethernet link between the first wireless link device and its corresponding Ethernet hardware. Then the first wireless link device returns to check (302) whether the wireless link between the first wireless link device and the second wireless link device is up.

As a result, in both error situations ("RLS Failed" information received or no RLS information received within the predetermined timeout period from the second wireless link device) the first wireless link device shuts down (318, 320) the local Ethernet link between the first wireless link device and its corresponding Ethernet hardware. Thus, the Ethernet port is pulled down from the first wireless link device, whereupon the Ethernet hardware, such as a switch, detects immediately from its own Ethernet port that there is a link failure.

Figure 4:
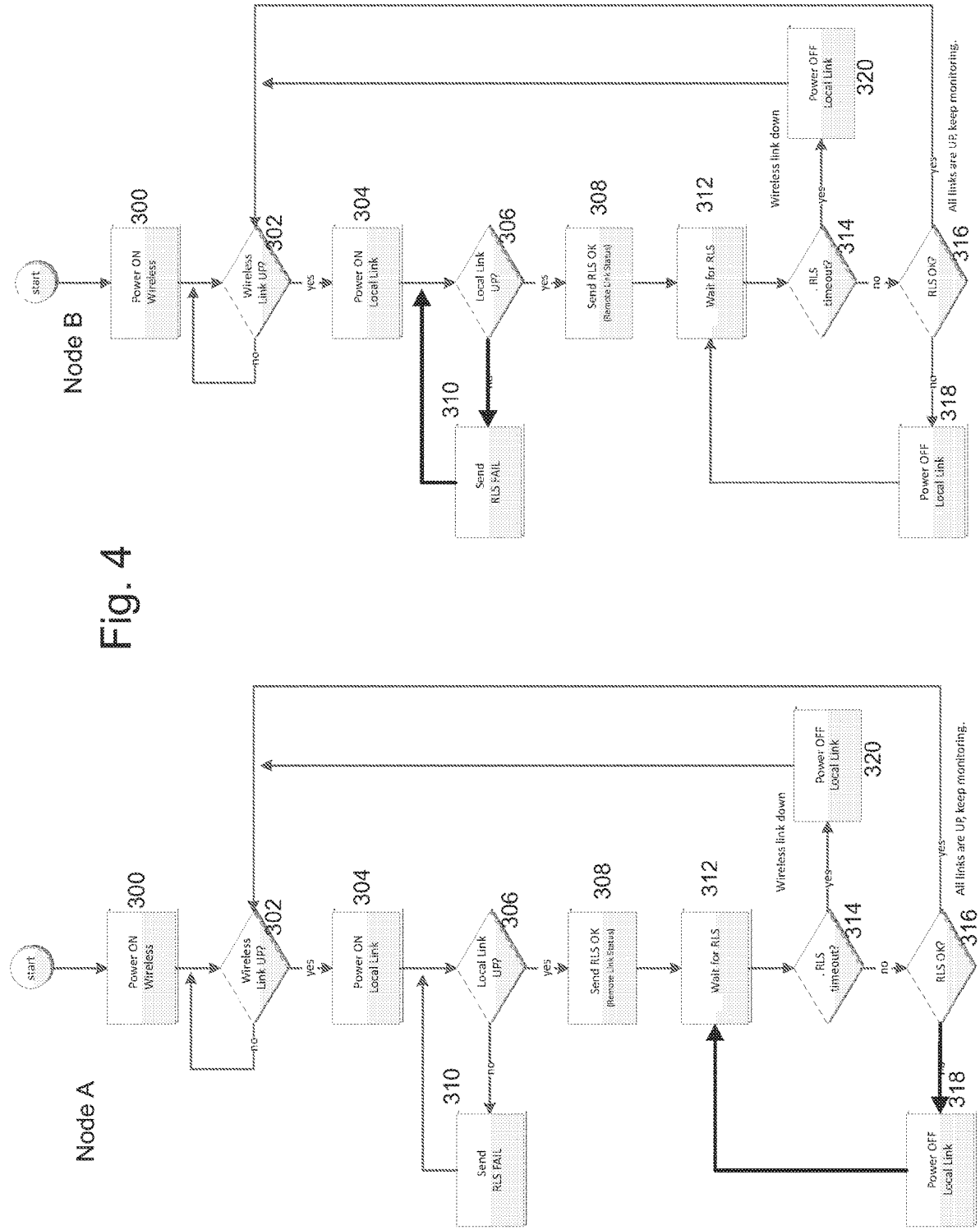
FIG. 4 shows an example of synchronous operation of at least two wireless link devices according to an embodiment.

Next, FIG. 4 depicts an example of synchronizing the link failure detection between the first link device (Node A) and the second link device (Node B). The flow chart of FIG. 3 is duplicated on the sides of Node A and Node B, indicating the similar operating procedure on both sides of the connection.

Let us assume that the Ethernet cable between the second link device (Node B) and the second Ethernet hardware is suddenly disconnected. Node B sends immediately an "RLS failed" message to the first link device (Node A) and remains in loop waiting for an indication about a re-established connection between the second link device (Node B) and the second Ethernet hardware. On the other hand, the first link device (Node A) receives the "RLS failed" message from the second link device, shuts down the wired connection to the first Ethernet-compliant network device and remains in loop waiting for an "RLS OK" message. In FIG. 4, the bolded arrows show the steps of the algorithm where node A and node B respectively are looping.

When the Ethernet cable between the second link device (Node B) and the second Ethernet hardware is again connected, Node B sends "RLS OK" message to Node A and continues operating in a normal state looping the monitoring steps. Node A receives the "RLS OK" message and continues similarly operating in a normal state.

According to an embodiment, the first wireless link device is arranged in a public transportation vehicle, such as a train, a tram, a metro train or a bus, arranged to travel a predetermined route.

According to an embodiment, data transmission between the first and the second wireless link device is used in wireless offload for transmitting data from the public transportation vehicle to at least one access point for further forwarding the data to a data communication network.

As mentioned above, the benefits of the embodiments are apparent when implemented in wireless data offload systems used in public transportation vehicles, where there may be a vast amount of data buffered in the vehicle and the buffered data must be offloaded as efficiently as possible when the vehicle arrives at a station or a stop. Many public transportation operators have started to offer a wireless data connection, such as a Wi-Fi connection, for the passengers to use during their trip. Moreover, the requirements for using video surveillance in public transportation vehicles are continuously increasing. The video data from a plurality of surveillance cameras, together with the data traffic of the passengers, easily amounts to an extensive quantity of data, and there is a challenge to transfer the buffered data to an offload station during stoppage without a significant delay.

Figure 5:
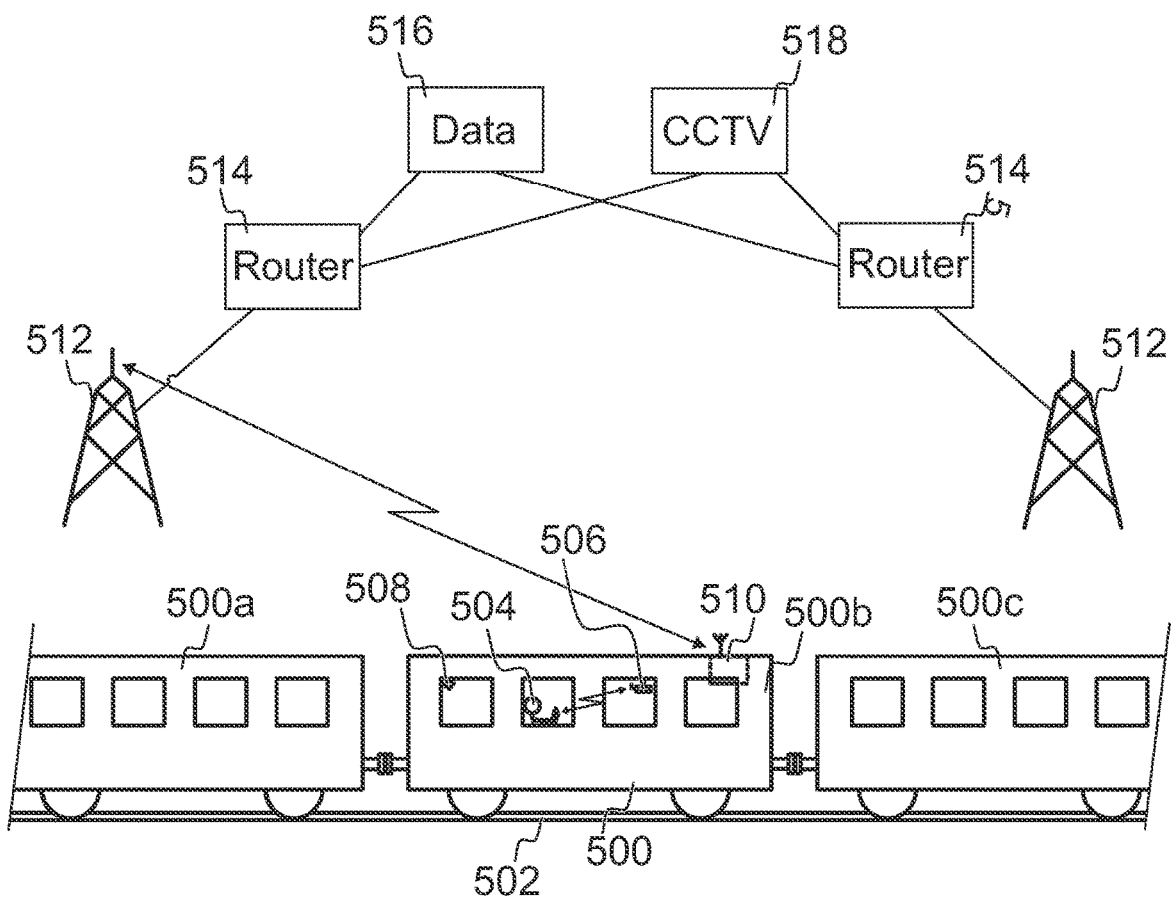
FIG. 5 shows a simplified example of a wireless data offload system according to an embodiment.

FIG. 5 shows a simplified example of the operating principle of a wireless data offload system. FIG. 5 illustrates a rail traffic vehicle 500, such as a train, a tram or a metro train, travelling on the rails 502. The rail traffic vehicle 500 may comprise one or more cars 500a, 500b, 500c, etc., typically arranged to transport passengers. A wireless data connection, such as a Wi-Fi connection, may be offered for the passengers to be used during their trip. In FIG. 5, a passenger 504 uses his/her mobile device via a wireless connection provided by a wireless base station 506. Moreover, each car may include one or more surveillance cameras 508 capturing video surveillance data within the car. During the trip, especially the video surveillance data may amount to an extensive quantity of data.

The vehicle 500 comprises at least one mobile communication unit 510, comprising a first wireless link device, which is arranged to communicate with at least a second wireless link device 512 arranged along a route of the vehicle 500. The mobile communication unit 510 may further comprise a first Ethernet-compliant server, which is arranged to obtain data from one or more data sources, such as one or more surveillance cameras and/or one or more data terminals operated by passengers, arranged in functional connection with the mobile communication unit. The first Ethernet-compliant server may be connected to the first wireless link device by an Ethernet cable.

The second wireless link device 512 is arranged to receive the data, and it is further arranged to forward the data to a second Ethernet-compliant server. The second Ethernet-compliant server may be connected to the second wireless link device by an Ethernet cable. From the second Ethernet-compliant server, the data may be forwarded to various data targets. The data targets may comprise, for example, a data communication network 516 and a video surveillance system 518, and the second Ethernet-compliant server may be arranged to forward the video data from said one or more surveillance cameras to the video surveillance system 518 and user data from said one or more data terminals operated by the passengers to the data communication network 516. The system may comprise one or more routers 514 arranged to route the data to an appropriate data target.

Since the stopping times at the stations or bus/tram stops may be very short, sometimes less than 10-15 seconds, an efficient offload process requires that establishing a link and a possible link failure should be detected as fast as possible. Thanks to the embodiments described herein, the time for detecting a possible link failure may be reduced to significantly less than one second whereby for example load balancing be arranged as fast as possible such that the wireless offload process may performed during the stoppage.

Figure 6:
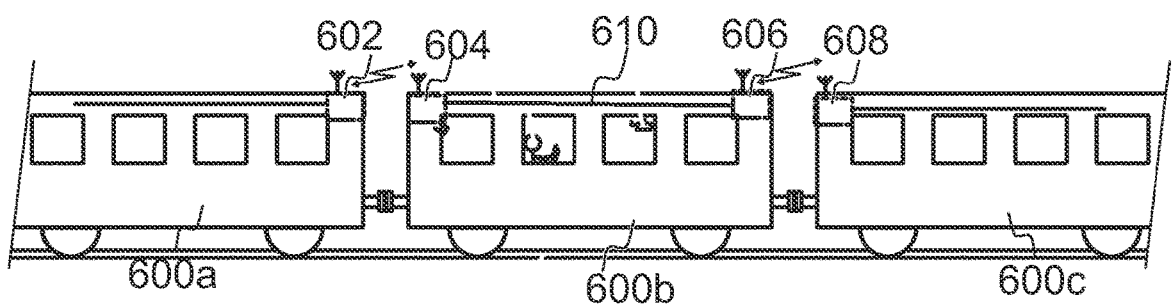
FIG. 6 shows a simplified example of an internal network of a public transportation vehicle according to an embodiment.

Another advantageous use case of the embodiments in public transportation is the internal network of a vehicle comprising several cars, such as a train, metro train or a tram. FIG. 6 shows a simplified example of an internal network of a public transportation vehicle, where the Ethernet connections between the cars are implemented as wireless links. FIG. 6 illustrates a rail traffic vehicle comprising a plurality of cars 600a, 600b, 600c, etc. A wireless data connection, such as a Wi-Fi connection, may be offered for the passengers to be used during their trip.

Each car comprises at least one, but preferably at least two wireless link devices arranged to communicate with a corresponding wireless link device of the adjacent car. Preferably there are one or more wireless link devices at both ends of the car. FIG. 6 shows car 600b having wireless link devices 604 and 606, one at both ends of the car. The wireless link device 604 establishes a wireless connection to a wireless link device 602 of car 600a, and the wireless link device 606 establishes a wireless connection to a wireless link device 608 of car 600b. Naturally, there may be two or more wireless link devices at both ends of each car, according to the arrangement shown in FIG. 1, thereby providing enhanced options for link aggregation and load balancing, as well as for a failsafe mechanism through the redundancy of the doubled connection. Each of the wireless link devices 602, 604, 606, 608 may be connected to an Ethernet-compliant network device (not shown), such as a server or a router. The connection within a car between the two Ethernet-compliant network devices may be arranged as a wired connection via a cable 610.

Implementing the internal network of a public transportation vehicle according to the embodiments may provide significant benefits, especially if a high throughput wireless connection, such as the IEEE 802.11ad or IEEE 802.11aj connection, is used together with link aggregation. Establishing a connection to the adjacent car may be carried out fats and automatically, and for example immediately upon attaching a new car to the vehicle, without connecting any network cables between the cars. On the other hand, a possible link failure between the cars is detected very fast, and for example, load balancing actions or actions relating to taking a redundant second link in use in case of the first link failure may be started immediately, thereby minimizing problems relating to network congestion and link failures.

In the above examples the wireless link device has been described as being connected to a public transportation vehicle. However, the embodiments are not limited to vehicles, but at least some of the embodiments are applicable, for example, to any portable or handheld communication devices, such mobile phones, smart phones, tablets or laptop computers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such non-transitory physical media as memory chips, or memory blocks implemented within the processor, magnetic media such as hard disk or floppy disks, and optical media such as for example DVD and the data variants thereof, CD.

A skilled man appreciates that any of the embodiments described above may be implemented as a combination with one or more of the other embodiments, unless there is explicitly or implicitly stated that certain embodiments are only alternatives to each other.

With the arrangement described above, the available bandwidth of all access points can be more optimally shared among the mobile clients and hence the performance of wireless offload may be improved. Moreover, in most cases, it enables one-to-one correspondence as mobile client-access point pairs, whereupon an automated selection of optimal pairs can be achieved.

It will be obvious for a person skilled in the art that with technological developments, the basic idea of the invention can be implemented in a variety of ways. Thus, the invention and its embodiments are not limited to the above-described examples but they may vary within the scope of the claims.

The invention claimed is:

1. A method for detecting a link status on an Ethernet connection between a first Ethernet-compliant network device and a second Ethernet-compliant network device, where at least part of a transmission path is implemented via a wireless connection between a first wireless link device connected to the first Ethernet-compliant network device and a second wireless link device connected to the second Ethernet-compliant network device, the method comprising the first wireless link device performing:
    establishing a wireless connection to the second wireless link device;
    establishing a wired connection to a first Ethernet-compliant network device;
    sending a remote link status message indicating the status of the wired connection between the first wireless link device and the Ethernet-compliant network device repeatedly to the second wireless link device;
    monitoring a remote link status message received from the second wireless link device, said remote link status message indicating the status of the wired connection between the second wireless link device and the second Ethernet-compliant network device; and
    detecting a link failure on the wired connection between the second wireless link device and the second Ethernet-compliant network device due to no remote link status message received within a predetermined period or the received remote link status message indicating a failed connection between the second wireless link device and the second Ethernet-compliant network device, shutting down the wired connection to the first Ethernet-compliant network device.

2. The method according to claim 1, wherein in response to shutting down the wired connection to the first Ethernet-compliant network device due to no remote link status message received within a predetermined period, continuing the method by monitoring whether there is a wireless connection established to the second wireless link device.

3. The method according to claim 1, wherein in response to shutting down the wired connection to the first Ethernet-compliant network device due to the received remote link status message indicating a failed connection between the second wireless link device and the second Ethernet-compliant network device, continuing the method by monitoring a next remote link status message received from the second wireless link device.

4. The method according to claim 1, wherein the link failure is detected from an Ethernet port of the first Ethernet-compliant network device in response to shutting down the wired connection to the first Ethernet-compliant network device.

5. The method according to claim 1, wherein the remote link status message sent repeatedly to the second wireless link device indicates the wired connection between the first wireless link device and the Ethernet-compliant network device to be either established or failed.

6. The method according to claim 1, wherein the wireless connection between the first and the second wireless link device is carried out according to IEEE 802.1 1 ad or IEEE 802.1 1 aj standard series.

7. The method according to claim 1, wherein the first wireless link device is arranged in a public transportation vehicle, such as a train, a tram, a metro train or a bus, arranged to travel a predetermined route.

8. The method according to claim 7, wherein data transmission between the first and the second wireless link device is used in wireless offload for transmitting data from the public transportation vehicle to at least one access point for further forwarding the data to a data communication network.

9. The method according to claim 7, wherein data transmission between the first and the second wireless link device is a part of transmission path of an internal network of the public transportation vehicle between two cars of said public transportation vehicle.

10. A system comprising:
at least a first wireless link device connected to a first Ethernet-compliant network device; and
a second wireless link device connected to a second Ethernet-compliant network device, wherein an Ethernet connection between the first and second Ethernet-compliant network devices is at least partly implemented via a wireless connection between first and the second wireless link devices, wherein the first wireless link device is arranged to
establish a wireless connection to the second wireless link device;
establish a wired connection to the first Ethernet-compliant network device;
send a remote link status message indicating the status of the wired connection between the first wireless link device and the Ethernet-compliant network device repeatedly to the second wireless link device;
monitor a remote link status message received from the second wireless link device, said remote link status message indicating the status of the wired connection between the second wireless link device and a second Ethernet-compliant network device;
detect a link failure on the wired connection between the second wireless link device and the second Ethernet-compliant network device due to no remote link status message being received within a predetermined period or the received remote link status message indicating a failed connection between the second wireless link device and the second Ethernet-compliant network device; and
in response to the link failure being detected, shut down the wired connection to the first Ethernet-compliant network device.

11. The system according to claim 10, wherein in response to shutting down the wired connection to the first Ethernet-compliant network device due to no remote link status message received within a predetermined period, the first wireless link device is arranged to continue by monitoring whether there is a wireless connection established to the second wireless link device.

12. The system according to claim 10, wherein in response to shutting down the wired connection to the first Ethernet-compliant network device due to the received remote link status message indicating a failed connection between the second wireless link device and the second Ethernet-compliant network device, the first wireless link device is arranged to continue monitoring a next remote link status message received from the second wireless link device.

13. The system according to claim 10, wherein the link failure is arranged to be detected from an Ethernet port of the first Ethernet-compliant network device in response to shutting down the wired connection to the first Ethernet-compliant network device.

14. The system according to claim 10, wherein the remote link status message sent repeatedly to the second wireless link device indicates the wired connection between the first wireless link device and the Ethernet-compliant network device to be either established or failed.

15. The system according to claim 10, wherein the first wireless link device is arranged in a public transportation vehicle, such as a train, a tram, a metro train or a bus, arranged to travel a predetermined route.

16. The system according to claim 15, wherein data transmission between the first and the second wireless link device is arranged in wireless offload for transmitting data from the public transportation vehicle to at least one access point for further forwarding the data to a data communication network.

17. A wireless link device comprising:
at least one processor;
a wireless transceiver; and
at least one Ethernet port for connecting to an Ethernet-compliant network device and at least one memory, said at least one memory stored with code thereon, which when executed by said at least one processor, causes the wireless link device to:
establish a wireless connection to a second wireless link device;
establish a wired connection to the Ethernet-compliant network device;
send a remote link status message indicating a status of the wired connection between the wireless link device and the Ethernet-compliant network device repeatedly to the second wireless link device;
monitor a remote link status message received from the second wireless link device, said remote link status message indicating a status of the wired connection between the second wireless link device and a second Ethernet-compliant network device;
detect a link failure on the wired connection between the second wireless link device and the second Ethernet-compliant network device due to no remote link status message being received within a predetermined period or the received remote link status message indicating a failed connection between the second wireless link device and the second Ethernet-compliant network device; and in response to the link failure being detected, shut down the wired connection to the first Ethernet-compliant network device.

18. The wireless link device according to claim 17, wherein in response to shutting down the wired connection to the Ethernet-compliant network device due to no remote link status message received within a predetermined period, the wireless link device is arranged to continue by monitoring whether there is a wireless connection established to the second wireless link device.

19. The wireless link device according to claim 17, wherein in response to shutting down the wired connection to the Ethernet-compliant network device due to the received remote link status message indicating a failed connection between the second wireless link device and the second Ethernet-compliant network device, the wireless link device is arranged to continue monitoring a next remote link status message received from the second wireless link device.

20. The wireless link device according to claim 17, wherein the wireless link device is arranged in a public transportation vehicle, such as a train, a tram, a metro train or bus, arranged to travel a predetermined route.

\* \* \* \* \*